April 5, 1960    J. R. FARRAR ET AL    2,931,087
FASTENERS
Filed Jan. 12, 1956
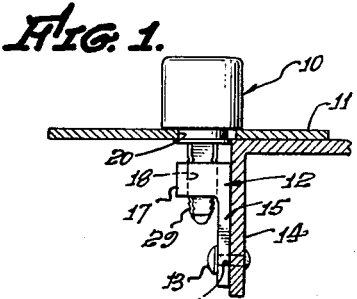
Fig. 1.
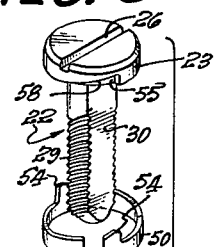
Fig. 5.
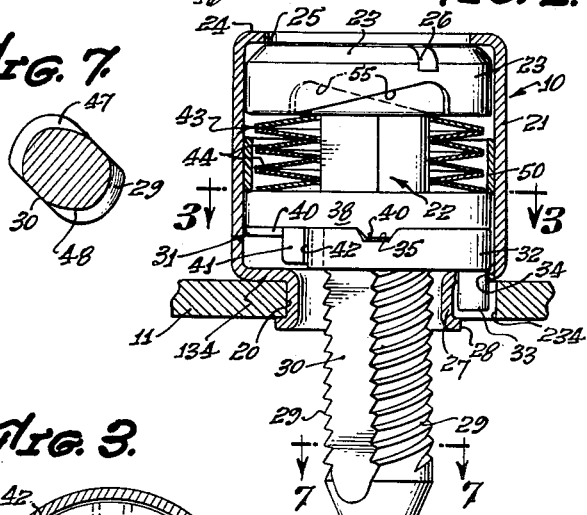
Fig. 2.
Fig. 7.
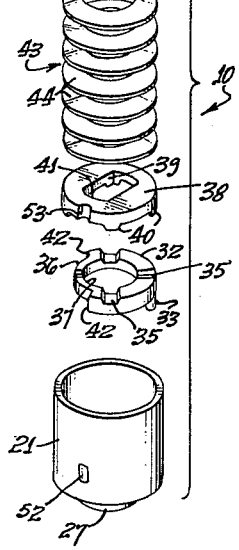
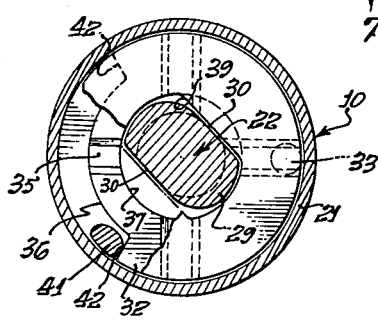
Fig. 3.
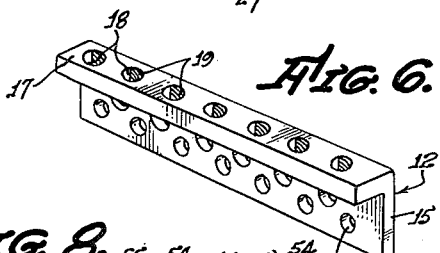
Fig. 6.
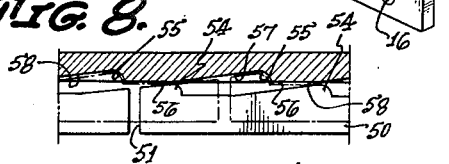
Fig. 8.
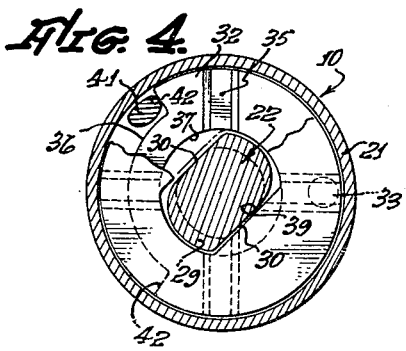
Fig. 4.
Guy E. Lentz,
Jack R. Farrar,
INVENTORS.
BY William P. Green
ATTORNEY.

United States Patent Office 2,931,087
Patented Apr. 5, 1960

2,931,087

FASTENERS

Jack R. Farrar, Whittier, and Guy E. Lentz, Burbank, Calif., assignors, by mesne assignments, to Airtek Dynamics, Inc., Los Angeles, Calif., a corporation of California Application January 12, 1956, Serial No. 558,767

18 Claims. (Cl. 24—221)

This invention has to do with quick make and break fasteners of the general type adaptable for attaching together work members of various forms, and especially for the connection of an outer sheet or panel member to an inner supporting or frame structure. More particularly the invention is directed to novel fasteners, the body portion of which is connected to the outer or panel member and contains a stud having detented action and receivable within an opening in the inner member to releasably connect the work parts. The present application is a continuation-in-part of and replaces our co-pending application Serial No. 298,753, filed July 14, 1952 on "Fasteners," now abandoned.

Our general object is to provide an improved fastener adaptable to low cost quantity production, and characterized by the quick facility with which it may serve to releasably connect the work parts not only where they have a given or certain dimensional relationship, but also where that relationship may vary. In this regard the invention contemplates utilizing as the fastener element a headed stud contained in a tubular exteriorly mounted body, and having diametrically opposed interrupted and preferably compound thread series engageable with correspondingly arranged interrupted thread series in the inner work member opening, so that the connecting threads are interengageable despite variations in the spacing of the fastener body from the member to which the stud connects. The connection is given take-up characteristics by using a fairly rapid lead thread angle and by spring-resisting inward displacement of the stud, so that rotation of the stud following initial interengagement of the threads produces a tightening action of the stud against the spring.

Certain features of particular importance have to do with the preferred arrangement in the body of the spring means, as well as the detenting means for holding the stud in its active and released positions. More particularly, the detenting means preferably consist of a detenting part which turns with the stud and is movable axially of the body, and which is engageable against shoulders formed in the body to releasably establish the stud positions. This detenting part may be spring pressed to its holding position by the same spring means that urge the stud axially outwardly. Desirably, the spring means are interposed axially between the head of the stud and the detenting part, to urge them in opposite axial directions. The shoulders which are engaged by the detenting part may be formed on an additional part which is contained in the body and is retained against rotation therein. This part is for best results located axially inwardly of the detenting part and at the inner end of the body. The most effective action and accommodation of the spring means may be accomplished by utilizing a type of spring comprising a series of frustro-conical discs contained about the stud within the body and having accurately predeterminable and balanced resistance to inward displacement of the stud.

In order to assure initial interengagement of the interrupted threads in a proper axial position of the stud. We provide means in the device for limiting inward axial movement of the stud when it is in a released rotary position, that is, a position in which the threads of the stud and the inner member are disengaged. These means, however, allow greater inward axial movement of the stud as the stud turns to its holding or locked position. Preferably, these means constitute a non-rotating part which is disposed about the spring means and has cam surfaces engaging the head of the stud to control its inward axial movement.

The invention has various addititonal features and objects, all of which together with those referred to in the foregoing, will be understood most readily and to best advantage from the following detailed description of a typical and illustrative embodiment of the invention shown by the accompanying drawing, in which:

Fig. 1 is a general view showing the fastener applied to an outer work member and connecting it with an inner member or frame structure;

Fig. 2 is an enlarged scale sectional view taken through the fastener body or shell;

Figs. 3 and 4 are cross-sections taken in the plane of line 3—3 of Fig. 2, illustrating the two positions of the detenting parts;

Fig. 5 is an exploded view showing the body and its contained parts in perspective;

Fig. 6 is a perspective view of the nut part carried by the inner work or frame member;

Fig. 7 is a cross-section on line 7—7 of Fig. 2; and

Fig. 8 is a developed view representing the configuration of the interengaging cam surfaces on the stud head and the part which limits its axial movement.

Referring first to the general showing of Fig. 1, the fastener is shown to comprise the body and stud assembly 10 carried by the outer work member or panel 11 and releasably connected to a nut part 12 attached as at 13 to an inner member or frame structure 14 which supports the outer panel 11. Referring to Fig. 6, the nut part 12 is shown typically to comprise an angular piece 15 containing a series of openings 16 through any of which rivets or other fasteners may be inserted as at 13 to secure the piece to the frame part 14. The top flange 17 of the nut piece contains a series of uniformly spaced openings 18 each containing diametrically opposed interrupted thread series 19 (corresponding to the later described thread series on the stud), the two thread series 19 in each opening having about 90° spacing to permit reception between them of the stud-carried threads. As will be understood, the outer work member or panel 11 may contain a series of alined openings 20 spaced at intervals corresponding to the spacing of the nut openings 18, to accommodate the fasteners 10 at any desired intervals, or the openings 20 may be spaced apart at intervals corresponding to any multiple spacings of the openings 18.

The assembly 10 comprises a tubular body or shell 21 containing a stud 22 whose head 23 is engageable against an annular inturned shoulder 24 at the outer end of the shell which contains an opening 25 through which a screw driver tool may be inserted into the turning slot 26 in the head. The stem of the stud extends through and beyond the inner reduced diameter neck 27 of the body which is received within opening 20 and secured therein by expansion at 28 of the mouth of the neck. The shank carries diametrically opposed series of threads 29 of about or slightly less than 90° extent, interrupted by diametrically opposed flat surfaces 30 on the shank. The threads 29 preferably are compound and have a fairly rapid lead angularity so that when engaged and turned within the nut threads 19 the stud will be displaced inwardly to a degree sufficient for appreciable take-up action and compression of the later described spring.

The shell 21 contains a detenting means 31, which is shown typically to include a bottom holding or locking disc 32 having a lug 33 projecting through an opening 34 in annular shoulder 134 of the shell, and projecting beyond that shoulder into an opening 234 formed in panel 11 at one point about the periphery of opening 20, to hold the disc and shell against rotation. Referring to Fig. 5, the disc 32 contains within its upper surface four radially extending recesses 35 at 90° spacing, and the side or periphery of the disc is arcuately relieved or notched at 36 through an angularity of about 90°, all for purposes that will presently appear. The disc has a central circular opening 37 through which the stud extends and within which the stud is rotatable. The detenting disc 38 has a stud-passing opening 39 corresponding generally in shape to the noncircular cross-section of the stud shank, so that the disc is keyed for rotation with the stud but is free for axial displacement relative thereto. On its bottom surface, the disc 38 carries at 90° spacing, radially extending detenting lugs 40 which enter the recesses 35 to releasably retain the stud in its work connecting and disconnecting positions. The detenting disc has a detenting lug 41 engageable against shoulders 42 at the ends of the notched-out portion of disc 32, to positively arrest rotation of the stud at the limits of its substantially 90° travel between work connecting and disconnecting positions.

Yielding means, generally indicated at 43 and resisting axially inward displacement of the stud, comprise a series of frustro-conical annular spring metal discs 44 in the arrangement illustrated and confined axially between the stud head 23 and the detenting disc 38. This type of spring is found to be particularly advantageous by reason of its capacity for predesign to afford accurately determinable resistance to displacement of the stud and detenting part, and by reason of the uniformity of that resistance circularly of the stud and detent.

Disposed about spring discs 44, there is provided a part 50 which functions to limit the axially inward movement of the stud relative to the body while the stud and nut threads are disengaged, to thus prevent the stud from advancing axially, prior to interengagement of the threads, to a position at which the stud is incapable of sufficient further inward advancement to effect a complete tightening operation.

The part 50 is cylindrical and interrupted by an axial slot 51 at one circular location (see Fig. 5), and is of spring metal which at all times tends to expand radially and therefore remains in tight engagement with the side wall of body 21. The wall of body 21 is locally deformed inwardly at 52, to form an inwardly projecting lug which is received within the slot 51 of part 50, to retain that part against rotation while permitting its axial movement. Detenting disc 38 may have a notch 53 at one point about its periphery, of a size to receive lug 52, so that disc 38 may be slipped axially into body 21 and axially past lug 52 in the position in which lug 52 registers with notch 53.

At its upper or axially outer end, part 50 has two diametrically opposed axially projecting lugs 54, which are receivable within correspondingly shaped diametrically opposed arcuate recesses 55 formed in the radially outer portion of the underside of stud head 23. The shapes of these lugs 54 and recesses 55 are shown best in Fig. 8, which represents them in developed form as they would appear if lying in a single plane. When stud 22 is in the rotary position in which its threads are disengaged from the threads in nut opening 18 (full line position of Fig. 8), the peaks of lugs 54 are positioned axially opposite a pair of surfaces 56 formed on the underside of the periphery of head 23 circularly between recesses 55, so that these surfaces will engage lugs 54 after only slight axially inward movement of the stud, and prevent its further inward movement. As stud 22 is turned in a clockwise direction through 90° to interengage the stud and nut threads, the essentially helical cam surfaces 57 and 58 of recesses 55 and lugs 54 respectively move into engagement and allow the stud to progressively advance axially inwardly to the position represented in broken lines in Fig. 8. In that position, the stud and nut threads are fully engaged, and the detenting plate 38 acts to releasably hold the stud in its active locking position. The pitch of helical cam surfaces 57 and 58 is preferably equal to the lead of the threads, to allow axial advancement of the stud exactly as required for interengagement of the threads 19 and 29.

Figs. 2 and 5 are illustrative of the manner in which the parts may be assembled, incorporated in the finished fastener, and applied to the work. As initially formed, the shell 21 has a cylindrically open configuration at its top, permitting insertion of the holding and detenting discs, part 50, spring assembly and stud in the order illustrated. When placed in the body shell the top of the latter is crimped over at 24 to confine the stud in the shell. As previously indicated, application of the fastener to the work requires simply the insertion of the shell neck 27 through the opening 20, with lug 33 received in opening 234, and expansion of the shell end at 28 by a suitable tool, not shown, beyond the diameter of the opening.

To facilitate and assure ready interengagement of the stud and nut threads, it is preferred to reduce the shank threads in diameter at locations 47 and 48 (see Fig. 7) adjacent their leading edges, the reduction in diameter being made at the roots of the threads as well as at their crests. This feature also characterizes the threads used in fasteners disclosed in the Hattan Patent No. 2,410,441, issued November 5, 1946, on "Fastener Assembly."

In considering the operation of the fastener, assume the parts to be positioned as in Figs. 2 and 3, with the interupted thread stud inserted into one of the work openings 18 so that the stud threads are received in the unthreaded sides of the opening. The connection between the parts is effected simply by rotating the stud by a screw driver inserted through the open shell end into the slot 26, to turn the stud and detent disc 38 through approximately 90° in a clockwise direction to the Fig. 4 position in which the stud threads 29 will have entered threads 18 in the work opening and axially displace the stud against the resistance of springs 43 away from engagement with the outer end of the shell. The effect of the spring thereafter is to exert against the stud a constant take-up thrust, and also to interengage the holding and detenting discs in their Fig. 4 positions so that the stud is effectively held against releasing rotation. A reverse effect and release of the connection between the parts, of course is effected by a reverse turning of the stud.

As will be apparent, detent lugs 40 are received within recesses 35 in both the Fig. 3 released position of the stud and the Fig. 4 active position, to releasably retain the stud in these positions. In the Fig. 3 released position, part 50 limits the inward axial movement of the stud, to prevent an operator from pressing the stud inwardly relative to the body before turning the stud into engagement with the nut threads. This, then, assures that the threads can be interengaged only when the stud is far enough out to subsequently allow enough inward movement during the turning of the stud to effect a complete 90° tightening action. That is, the stud is prevented from initially engaging the nut threads in a position in which the stud is too far inserted.

We claim:
1. A fastener comprising a tubular body adapted to be secured to the outer of a pair of inner and outer work members to be joined by the fastener, a stud which is rotatable and movable axially relative to the body and has a head movably retained within the body, said stud having a shank carrying diametrically opposed interrupted screw thread series engageable with and disengageable from correspondingly arranged screw thread series in said inner member opening, spring means in the body yieldingly resisting inward axial displacement of the stud relative to the body, means forming detenting shoulders within the body, a detenting part in the body in addition to said spring means and shoulders keyed to said stud for rotation therewith and movable axially of the stud and releasably engageable with said detenting shoulders to retain the stud against turning between a holding position of engagement with the threads of the inner member and a released position of disengagement therefrom, said spring means being positioned to yieldinglgy urge said detenting part axially into holding relation with said detenting shoulders, and a generally annular blocking part in the body disposed about said spring, there being cam surfaces on said blocking part and stud, interengageable to block the stud when in said released position against movement axially inwardly as far as the stud will move when in said holding position, to thereby prevent initial interengagement of the threads in an improper axial position of the stud, said blocking part having a slot at one location about its periphery receiving a lug carried by the body to prevent rotation of the blocking part while permitting its axial movement.

2. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw thread series at two sides thereof, a nut part at the outside of and separate from said body and having an opening with correspondingly arranged interrupted screw thread series at two sides thereof threadly engaging said stud threads in said holding position of the stud, said stud threads being constructed to move out of threaded engagement with the nut threads upon rotation of the stud relative to the body to released position so that the stud and nut are then relatively axially separable, a shoulder carried by the body and engageable by the stud head in a relation to limit axially outward movement of the stud and retain the stud head against movement axially outwardly from within the body, said body having an opening at its axially outer end adapted to pass an actuating tool into engagement with said head of the stud, spring means in the body positioned to yieldingly resist inward axial displacement of the stud relative to the body and to urge said stud axially outwardly against said shoulder, two separate detenting parts disposed about said stud within the body, and spring pressed axially against one another, said stud being free for movement axially relative to both of said detenting parts, means holding a first of said detenting parts against rotation relative to the body, and means keying the second of said detenting parts to said stud for rotation therewith while allowing said axial movement of the stud relative to the detenting parts, said two detenting parts having detent shoulders interengageable in a relation to retain the stud against turning movement relative to the body between said holding position and said released position.

3. A fastener as recited in claim 2, in which said means holding said first detenting part against rotation comprise a projection on said first part projecting axially into an opening in said body to retain said first part against said rotation.

4. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw threads, a nut part at the outside of and separate from said body and having an opening with correspondingly arranged interrupted threads threadedly engaging said stud threads in said holding position of the stud, said stud threads being constructed to move out of threaded engagement with the nut threads upon rotation of the stud relative to the body to released position so that the stud and nut are then relatively axially separable, spring means positioned to yieldingly resist inward axial displacement of the stud relative to the body and to urge said stud axially outwardly, detent means in the body in addition to said spring means operable to retain the stud against turning between said holding position and said released position, and a blocking element positioned and constructed to block said stud, when the stud is in said released position but not when the stud is turned to said holding position, against movement axially inwardly relative to the body beyond a predetermined axial position to thereby prevent initial interengagement of the threads in an improper axial position of the stud, said stud being free for further axially inward movement beyond said predetermined axial position when the stud is turned to said holding position.

5. A fastener comprising a tubular body adapted to be secured to an outer work member, a stud which is rotatable relative to the body between a holding position and a released position and is also movable axially relative to the body and has a head movably retained within the body, said stud having a shank carrying interrupted screw thread series at two sides thereof, a nut part having an opening with correspondingly arranged interrupted screw thread series at two sides thereof threadedly engaging said stud threads in said holding position of the stud, said stud threads being constructed to move out of threaded engagement with the nut threads upon rotation of the stud to released position so that the stud and nut are then relatively axially separable, a shoulder carried by the body engageable by the stud in a relation limiting axially outward movement of the stud and retaining the stud head against movement axially outwardly from within the body, said body having an axially outer opening for passing an actuating tool into engagement with said head of the stud, spring means in the body positioned to yieldingly resist inward axial displacement of the stud relative to the body and to urge said stud axially outwardly against said shoulder, means forming detent shoulders within the body, and a detenting part in the body in addition to said spring means and said stud and said shoulders and keyed to said stud for rotation therewith, said detenting part being movable axially relative to the stud and relative to the body and being releasably engageable with said detenting shoulders to retain the stud against turning between said holding position of engagement with the threads of the nut part and a released position of disengagement therefrom, said spring means which urge the stud outwardly being positioned to also yieldingly urge said detenting part axially relative to said body and into holding relation with said detenting shoulders.

6. A fastener as recited in claim 5 in which said spring means are interposed axially between said stud head and said detenting part and urge the head axially outwardly and the detenting part axially inwardly into holding relation with said shoulders.

7. A fastener as recited in claim 5, in which said tubular body has an axially outer end portion containing said tool passing opening and forming said first mentioned shoulder adjacent the opening adapted to engage the stud head and limit its outward movement.

8. A fastener as recited in claim 5, in which said tubular body has a reduced diameter axially inner end portion adapted to extend through an opening in said outer member and to be expanded beyond the diameter of the opening to secure the body to said outer member.

9. A fastener as recited in claim 5, in which said detenting part is disposed about said stud and contains a noncircular opening within which a similarly noncircular portion of the stud shank is received to rotatively key the detenting part to the stud while allowing relative axial movement of these parts.

10. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw thread series at opposite sides thereof, a nut part at the outside of and separate from said body and having an opening with correspondingly arranged interrupted screw thread series at opposite sides thereof threadedly engaging said stud threads in said holding position of the stud, said stud threads being constructed to move out of threaded engagement with the nut threads upon rotation of the stud relative to the body to released position so that the stud and nut are then relatively axially separable, a shoulder carried by the body and engageable by the stud head in a relation to limit axially outward movement of the stud and retain the stud head against movement axially outwardly from within the body, said body having an opening at its axially outer end adapted to pass an actuating tool into engagement with said head of the stud, said body having a second shoulder at its axially inner end, a first detenting part in the body about said stud and bearing axially inwardly against said second shoulder, means retaining said first detenting part against rotation relative to the body, a second detenting part in the body about said stud and bearing axially inwardly against said first part, said second part being keyed to said stud for rotation therewith, said two parts having detent shoulders interengageable in a relation to retain the stud against turning movement relative to the body between said holding position and said released position, and spring means about said stud axially between said stud head and said second detenting part to yieldingly urge said stud axially outwardly against said first shoulder and urge said second part axially inwardly against said first part.

11. A fastener as recited in claim 10, including a blocking part in the body about said spring means and stud keyed against rotation relative thereto, said blocking part and head having cam surfaces interengageable in a relation to prevent axially inward movement of the stud relative to the body as far in said released position as in said holding position.

12. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw threads, a nut part at the outside of and separate from said body and having an opening with correspondingly arranged interrupted threads threadedly engaging said stud threads in said holding position of the stud, said stud threads being constructed to move out of threaded engagement with the nut threads upon rotation of the stud relative to the body to released position so that the stud and nut are then relatively axially separable, spring means positioned to yieldingly resist inward axial displacement of the stud relative to the body and to urge said stud axially outwardly, detent means in the body in addition to said spring means operable to retain the stud against turning between said holding position and said released position, and means blocking said stud when in said released position against movement axially inwardly relative to the body beyond a predetermined axial position to thereby prevent initial interengagement of the threads in an improper axial position of the stud, said stud being free for further axially inward movement beyond said predetermined axial position when the stud is turned to said holding position, said blocking means including cam means having an effective pitch approximately equal to the lead of said interrupted threads to allow axially inward advancement of the stud and nut as required for meshing of the stud and nut threads.

13. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw threads, a nut part at the outside of and separate from said body and having an opening with correspondingly arranged interrupted threads threadedly engaging said stud threads in said holding position of the stud, said stud threads being constructed to move out of threaded engagement with the nut threads upon rotation of the stud relative to the body to released position so that the stud and nut are then relatively axially separable, spring means positioned to yieldingly resist inward axial displacement of the stud relative to the body and to urge said stud axially outwardly, detent means in the body in addition to said spring means operable to retain the stud against turning between said holding position and said released position, and means blocking said stud when in said released position against movement axially inwardly relative to the body beyond a predetermined axial position to thereby prevent initial interengagement of the threads in an improper axial position of the stud, said stud being free for further axially inward movement beyond said predetermined axial position when the stud is turned to said holding position, said blocking means including an essentially annular part disposed about said spring means and stud within the body and engageable with said head in a relation to prevent said axially inward movement of the stud as far in said released position as in said holding position.

14. A fastener as recited in claim 13, in which said blocking part and head have interengageable cam surfaces with an effective pitch approximately equal to the lead of said interrupted threads to allow axially inward advancement of the stud as required for meshing of the stud and nut threads.

15. A fastener as recited in claim 13, including means retaining said blocking part against rotation in the body.

16. A fastener comprising a tubular body adapted to be secured to an outer work member, a stud which is rotatable relative to the body between a holding position and a released position and is also movable axially relative to the body and has a head movably retained within the body, said stud having a shank carrying interrupted screw thread series at opposite sides thereof, a nut part having an opening with correspondingly arranged interrupted screw thread series at opposite sides thereof threadedly engaging said stud threads in said holding position of the stud, said stud threads being constructed to move out of threaded engagement with the nut threads upon rotation of the stud to released position so that the stud and nut are then relatively axially separable, a shoulder carried by the body engageable by the stud in a relation limiting axially outward movement of the stud and retaining the stud head against movement axially outwardly from within the body, said body having an axially outer opening for passing an actuating tool into engagement with said head of the stud, spring means in the body positioned to yieldingly resist inward axial displacement of the stud relative to the body and to urge said stud axially outwardly against said shoulder, means forming detent shoulders within the body, and a detenting part in the body in addition to said spring means and shoulders keyed to said stud for rotation therewith and moveable axially of the stud and releasably engageable with said detenting shoulders to retain the stud against turning between said holding position of engagement with the threads of the nut part and a released position of disengagement therefrom, said spring means which urge the stud outwardly being positioned to also yieldingly urge said detenting part axially into holding relation with said detenting shoulders, said detenting part being disposed about said stud and containing a noncircular opening within which a similarly noncircular portion of the stud shank is received to rotatively key the detenting part to the stud while allowing relative axial movement of these parts.

17. A fastener as recited in claim 16, in which said means forming the detenting shoulders includes an element positioned axially inwardly of the detenting part, said spring means being interposed axially between said stud head and said detenting part in a relation urging the former axially outwardly and the latter axially inwardly against said element.

18. A fastener comprising a tubular body adapted to be secured to an outer work member, a stud which is rotatable relative to the body between a holding position and a released position and is also movable axially relative to the body and has a head movably retained within the body, said stud having an axially projecting shank carrying interrupted screw thread series at two sides thereof, a nut part at the outside of and separate from said body and having an opening with correspondingly arranged interrupted screw thread series at two sides thereof threadedly engaging said stud threads in said holding position of the stud, said stud threads being constructed to move out of threaded engagement with the nut threads upon rotation of the stud relative to the body to released position so that the stud and nut are then relatively axially separable, a shoulder carried by the body and engageable by the stud head in a relation to limit axially outward movement of the stud and retain the stud head against movement axially outwardly from within the body, said body having an opening at its axially outer end adapted to pass an actuating tool into engagement with said head of the stud, spring means in the body positioned to yieldingly resist inward axial displacement of the stud relative to the body and to urge said stud axially outwardly against said shoulder, two separate detenting parts disposed about said stud within the body, and spring pressed axially against one another, said stud being free for movement axially relative to both of said detenting parts, means holding a first of said detenting parts against rotation relative to the body, and means keying the second of said detenting parts to said stud for rotation therewith while allowing said axial movement of the stud relative to the detenting parts, said two detenting parts having detent shoulders interengageable in a relation to retain the stud against turning movement relative to the body between said holding position and said released position, and additional shoulders on said two detenting parts positively limiting rotary movement of said second part relative to said first part to a predetermined portion of a turn corresponding to the rotary distance between said holding and released positions.

References Cited in the file of this patent

UNITED STATES PATENTS

| | | |
|---|---|---|
| 1,314,735 | Derby | Sept. 2, 1919 |
| 2,420,733 | Cannova | May 20, 1947 |
| 2,580,666 | Dzus | Jan. 1, 1952 |
| 2,811,765 | Mathews | Nov. 5, 1957 |

FOREIGN PATENTS

| | | |
|---|---|---|
| 564,108 | Great Britain | Sept. 13, 1944 |